United States Patent [19]

Holley

[11] Patent Number: 4,480,813

[45] Date of Patent: Nov. 6, 1984

[54] KELLY COCK ROTARY DRIVE MECHANISM

[75] Inventor: Patrick C. Holley, Lynwood, Calif.

[73] Assignee: Hydril Company, Los Angeles, Calif.

[21] Appl. No.: 400,431

[22] Filed: Jul. 26, 1982

[51] Int. Cl.³ ............................................. F16K 51/00
[52] U.S. Cl. .................................. 251/288; 251/292; 251/315
[58] Field of Search .................. 251/288, 292, 315

[56] References Cited

U.S. PATENT DOCUMENTS

| | | | |
|---|---|---|---|
| 2,913,219 | 11/1959 | Freed | 251/288 |
| 3,967,811 | 7/1976 | Keller | 251/288 |
| 4,059,250 | 11/1977 | Guldener et al. | 251/315 |
| 4,078,763 | 3/1978 | Yamamoto | 251/315 |

Primary Examiner—Martin P. Schwadron
Assistant Examiner—Sheri Novack
Attorney, Agent, or Firm—William W. Haefliger

[57] ABSTRACT

A valve body forms flow passages at longitudinally opposite sides of a stopper to be brought into communication through the stopper when the stopper is rotated from closed to open positions, the body having a side opening. To rotate the stopper there are provided:

(a) a sleeve adapted for reception in the side opening, the sleeve having retainer structure to interfit shoulder structure on the body for blocking rotation of the sleeve in the side opening, (b) a crank received in the sleeve for rotation therein, thereby to rotate the valve stopper, and (c) interengageable stop shoulder structure on the crank and sleeve to limit rotation of the crank and the stopper at stopper open and closed positions.

The retainer structure typically includes two tangs projecting in spaced apart relation for reception in grooving in the body.

21 Claims, 15 Drawing Figures

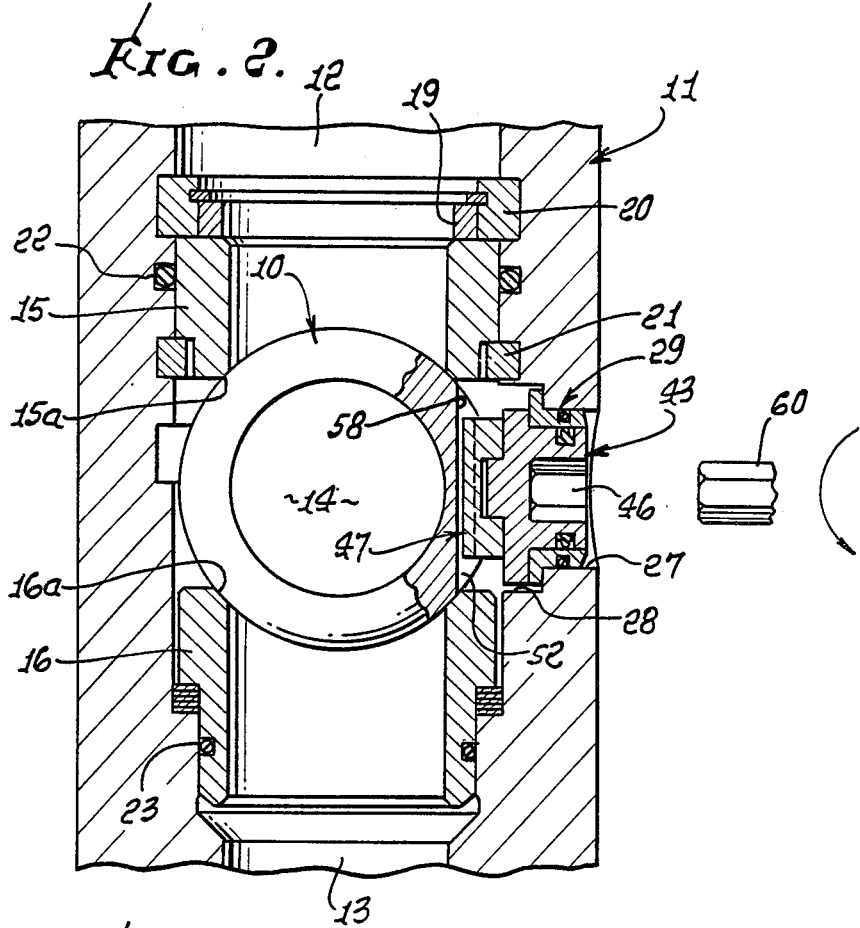
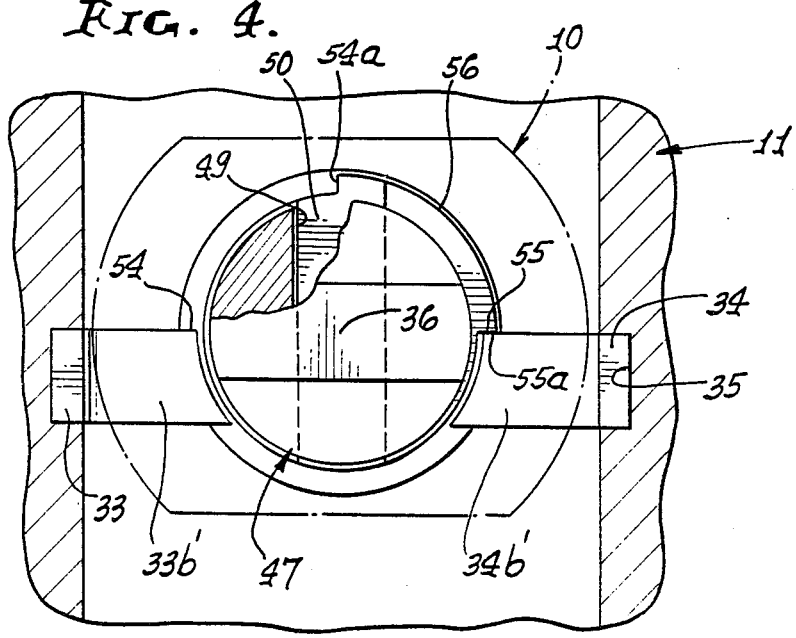

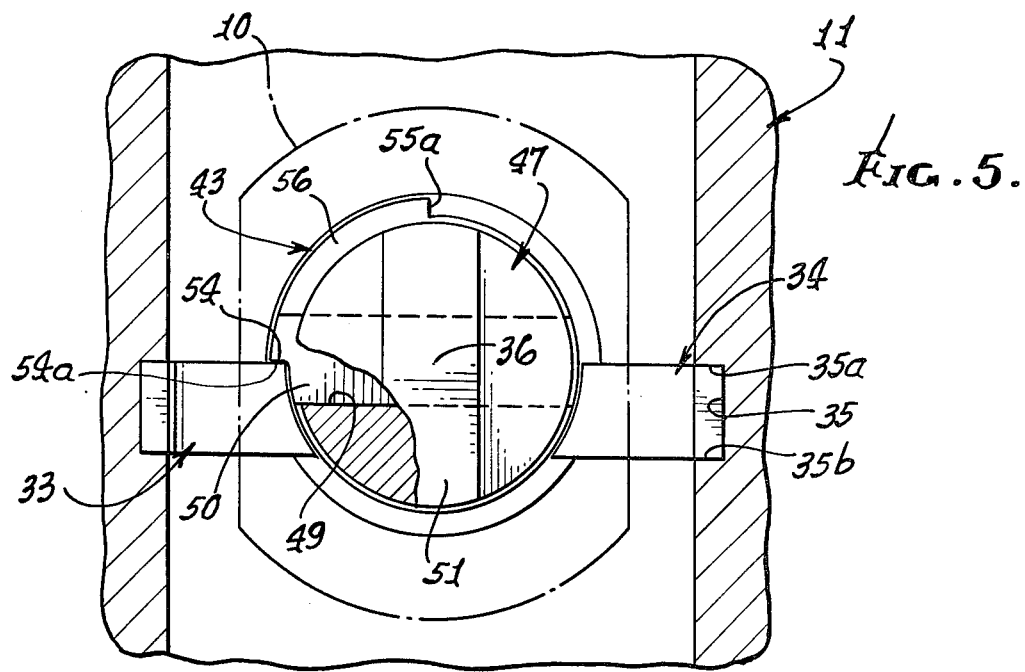
FIG. 5.
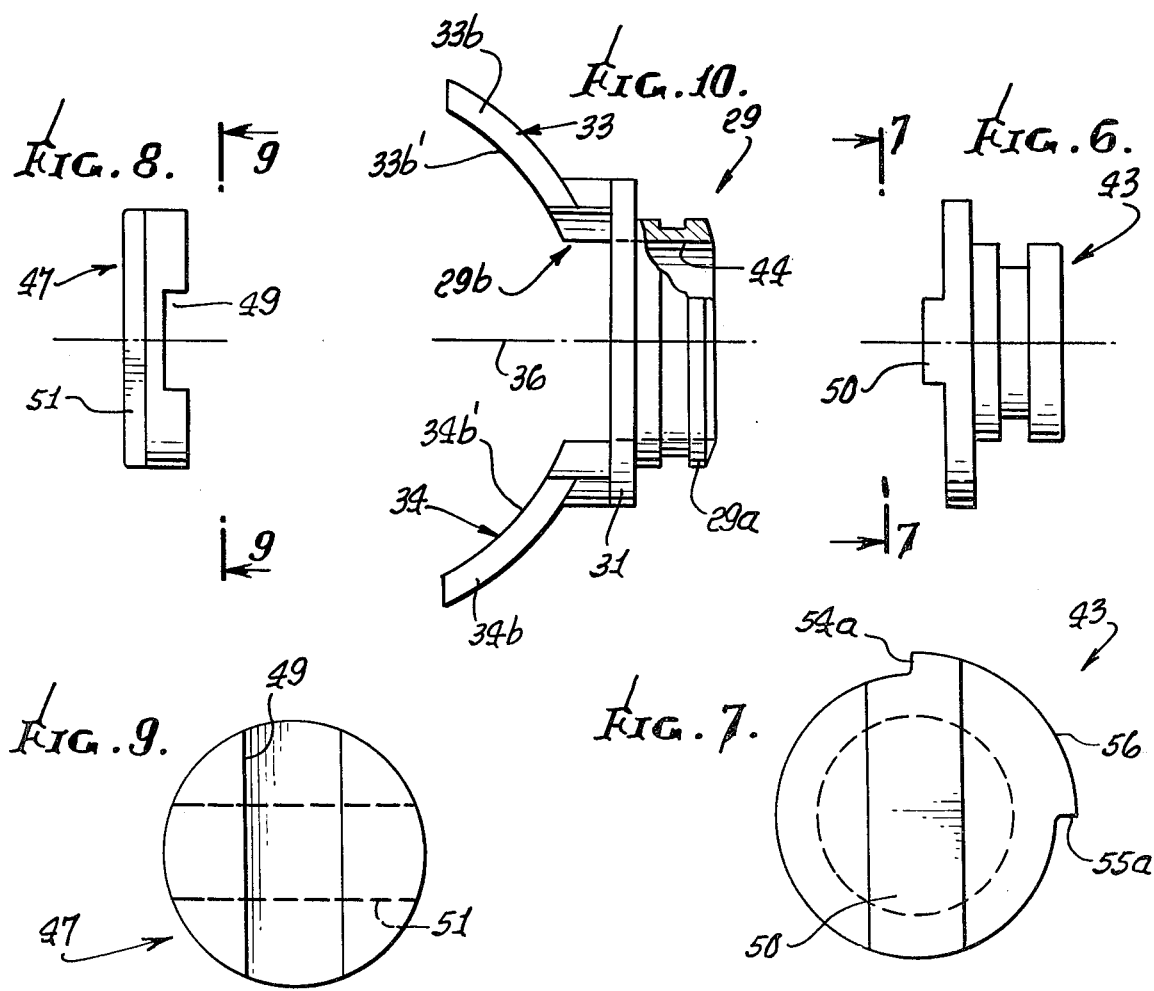
FIG. 8. FIG. 10. FIG. 6.
FIG. 9. FIG. 7.

4,480,813

KELLY COCK ROTARY DRIVE MECHANISM

BACKGROUND OF THE INVENTION

This invention relates generally to movement of valve stoppers, and more particularly concerns the operation of safety valves used in well tubing strings and kellycocks used in drill pipe strings.

It is extremely important that safety valves and kellycocks be operational at all times. Safety valves and kellycocks are typically manually operated by means of wrenches at the string exterior in order to close off flow in the string as during a possible well blowout. It is particularly important that when the valve stopper is open, an unrestricted bore is achieved to avoid turbulence, cavitation and pressure losses. It is equally as important that the valve stopper be properly aligned when closed to obtain a leak proof seal. Binding or misalignment of such kellycocks and safety valves, or difficulty with their operation, must be avoided; however, in the past the construction of the valve stopper rotating apparatus did not always assure trouble-free operation or proper alignment at all times, whereby serious problems could arise.

SUMMARY OF THE INVENTION

It is a major object of the invention to provide a solution to the above described problems. Basically, the invention is embodied in a compact, simple and rugged valve turning apparatus adapted for installation in a side opening in a valve body, to be coupled to the valve stopper. Basically, the apparatus comprises:

(a) a sleeve adapted for reception in the side opening, the sleeve having retainer structure to interfit shoulder structure on the body for blocking rotation of the sleeve in the side opening, (b) a crank received in the sleeve for rotation therein, thereby to rotate the valve stopper, and (c) interengageable stop shoulder structure on the crank and sleeve to limit rotation of the crank and the stopper at stopper open and closed positions.

As will appear, the retainer structure on the bearing sleeve may be positively locked to the valve body by means of two tangs projecting in spaced apart relation for reception in grooving in the valve body interior; the tangs may include first portions extending laterally and second portions extending with relative flare in the direction of annular grooving in the valve body to be retained therein by the valve stopper; and the tangs also serve to provide stop shoulders to limit rotation of the crank between stopper open and closed positions, as will be seen.

It is another object to provide a simple and effective coupler for coupling the rotation of the crank to the stopper via tongue and groove connections universally relatively movable in a plane or planes normal to the lateral axis of valve stopper rotation, as will appear.

These and other objects and advantages of the invention, as well as the details of an illustrative embodiment, will be more fully understood from the following specification and drawings, in which:

DRAWING DESCRIPTION

FIG. 2 is a view like FIG. 1, but with the valve closed;

FIG. 4 is a fragmentary section on lines 4—4 of FIG. 3, the valve being open;

FIG. 5 is a view like FIG. 4, but with the valve closed;

FIG. 6 is a side elevation of an operating crank as used and shown in FIGS. 1-5;

FIG. 7 is an end view of FIG. 6 crank, taken on lines 7—7 of FIG. 6, and rotated 90°;

FIG. 8 is a side elevation of a coupler as employed in FIGS. 1-5;

FIG. 9 is an end view of the FIG. 8 coupler, taken on lines 9—9 of FIG. 8;

FIG. 10 is a side elevation of a sleeve as employed in FIGS. 1-5;

DETAILED DESCRIPTION

Figure 1:
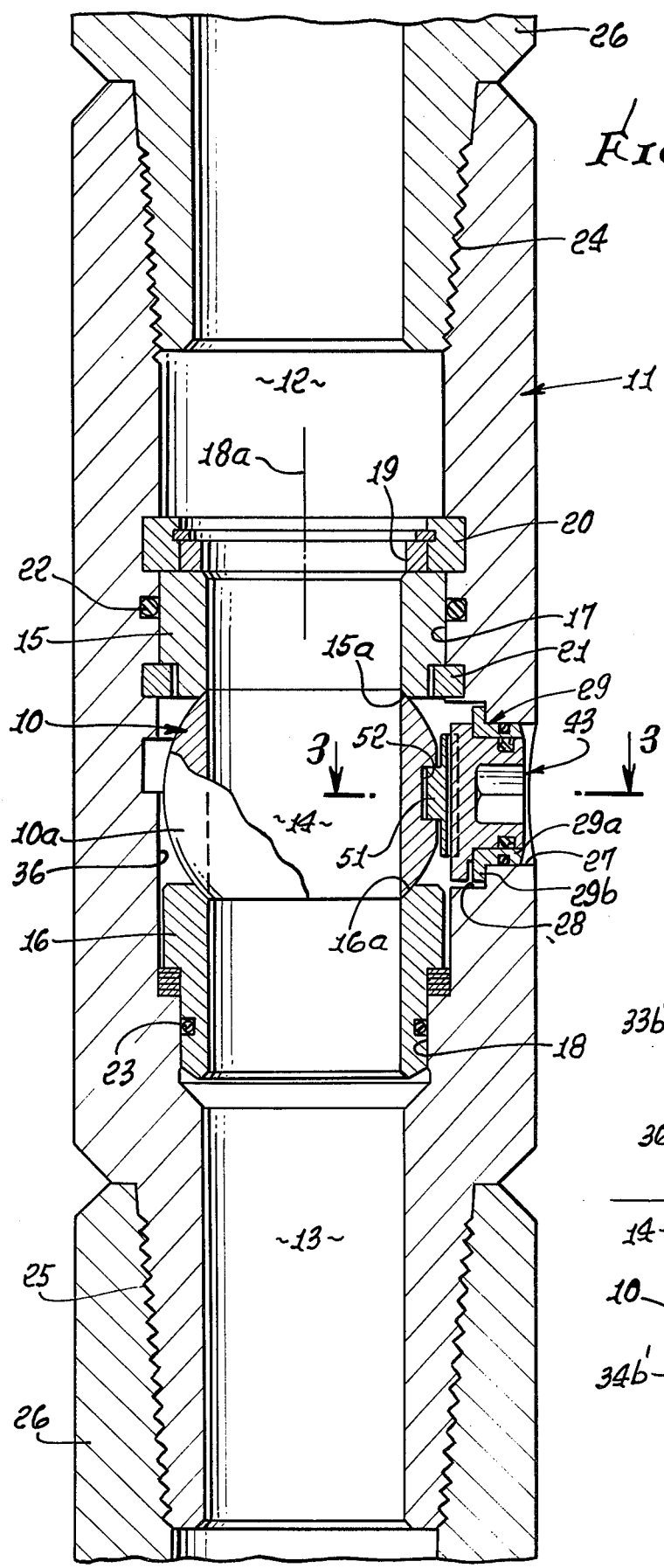
FIG. 1 is a vertical elevation in section showing a valve assembly incorporating the invention, the valve being open.
Figure 3:
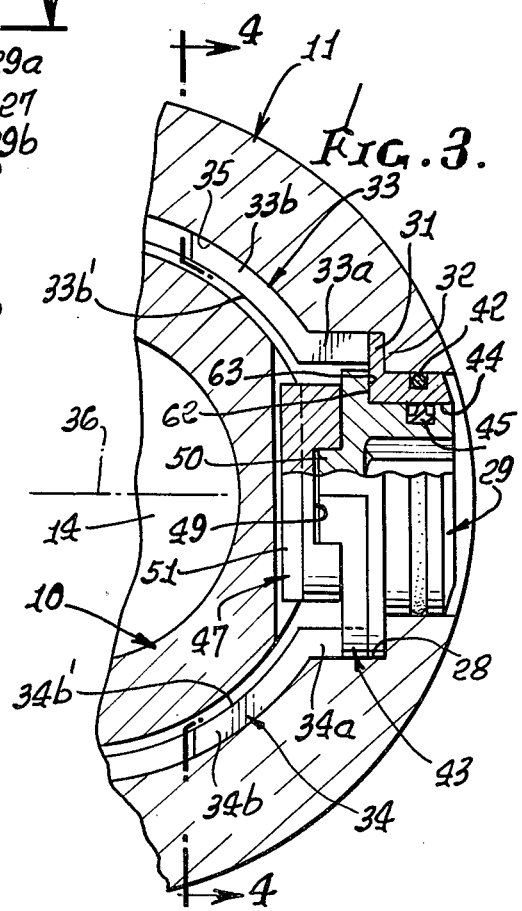
FIG. 3 is a fragmentary horizontal section taken on lines 3—3 of FIG. 1.

In FIGS. 1-5, the valve stopper 10 is located in a valve body 11 that forms flow passages 12 and 13 at longitudinally opposite sides of the stopper. Those passages are adapted to be brought into communication, via a through passage 14 in the stopper, when the stopper is rotated from closed position (see FIG. 2) to open position (see FIGS. 1 and 3). In this regard, annular sleeves 15 and 16 may be located in body counterbores 17 and 18 respectively, the sleeves having spherical end surfaces or seats 15a and 16a in sealing engagement with the spherical surface 10a of the stopper as the stopper rotates. Well fluid pressure typically acts against the stopper to urge it against the downstream seat. Sleeve 15 is retained in axial position by rings 19, 20 and 21, as shown. O-ring seals appear at 22 and 23. Body 11 may comprise a tubular sub, connectible at 24 and 25 in a pipe string 26.

Body 11 has a side opening defined, for example, by side bore 27 and counterbore 28. A bearing sleeve 29 is adapted for reception in the side opening, and is shown to include a tubular portion 29a received in bore 27, and a retainer portion 29b received in the counterbore 28 to interfit shoulder structure on the body, for blocking rotation of the sleeve in the side opening. To this end, the retainer portion 29b is shown to include an annular flange 31 engaging body step shoulder 32, and two tangs 33 and 34 on the flange and projecting in spaced apart relation for reception in grooving 35 formed in the body counterbore 36. That grooving extends annularly about axis 18a, and receives annularly extending tang second portions 33b and 34b which are integral with tang first portions 33a and 34a connected with flange 31. Such first portions project in the direction of the lateral axis 136, which is the axis of stopper rotation. Tang first portions 33a and 34a interfit counterbore 28. Accordingly the groove 35, and specifically its end walls 35a and 35b, block rotation of the tangs, and the sleeve 29, about axis 136, and the ball valve 10 remains inwardly of the tang second portions 33b and 34b in the grooving, those second portions having spherical or cylindrical surfaces 33b' and 34b' matching the ball surface curvature. At the same time, rotation of the ball about axis 136 is not blocked by the tangs. An O-ring seal is employed at 42 between the sleeve 29 and the bore 27.

The operative combination also includes a crank 43 received in a bore 44 defined by the tubular sleeve, to be rotatable relative thereto, an annular seal 45 being provided therebetween. The crank is shown to have an end recess 46 with internal hex shoulders to be engaged by a corresponding wrench 60 for rotating the crank, thereby to rotate the valve stopper. To that end, a coupler 47 may be provided between the crank and the stopper to couple them together. As shown, the coupler has tongue and groove connection with the crank, and tongue and groove connection with the stopper, accommodating relative adjustment sliding, to prevent binding. The coupler is in the form of a disc having a transverse recess or groove 49 receiving a corresponding transverse tongue 50 integral with the crank, and accommodating relative adjustment sliding, in a transverse direction normal to axis 36, of these tongue and groove elements. At the same time, a transverse tongue 51 on the coupler fits in a transverse groove 52 in the ball stopper, the directions of these elements being perpendicular to the directions of tongue 50 and groove 49. Accordingly, universal adjustment in a plane normal to axis 36 is provided.

Also provided is stop shoulder structure on the crank and sleeve to limit rotation of the crank and the stopper at stopper open and closed positions. Such stop shoulder structure on the sleeve may with unusual advantage be located on the edges of the first portions of the tangs, as for example at 54 and 55 in FIGS. 4 and 5. Note that such edges are at opposite sides of lateral axis 36, i.e. are spaced apart about 180°. Correspondingly, stop shoulders 54a and 55a are located on an arcuate quadrant ridge 56 on the crank, and are spaced apart at 90° about axis 36. Shoulder 54a also intersects the tongue 50, as shown in FIG. 4. Face 58 of the ball valve blocks decoupling of the coupler from the crank.

Accordingly, a rugged, highly compact, non-binding, easily assembled structure is formed to transmit rotation from an external wrench to the ball stopper, to rotate it between open and closed positions, as described.

Interengaged and relatively sliding surfaces of the sleeve, crank and coupler may be coated with low-friction material such as TEFLON, to further promote non-binding and ease of operation. See for example interengaged surfaces 62 and 63.

Figure 11:
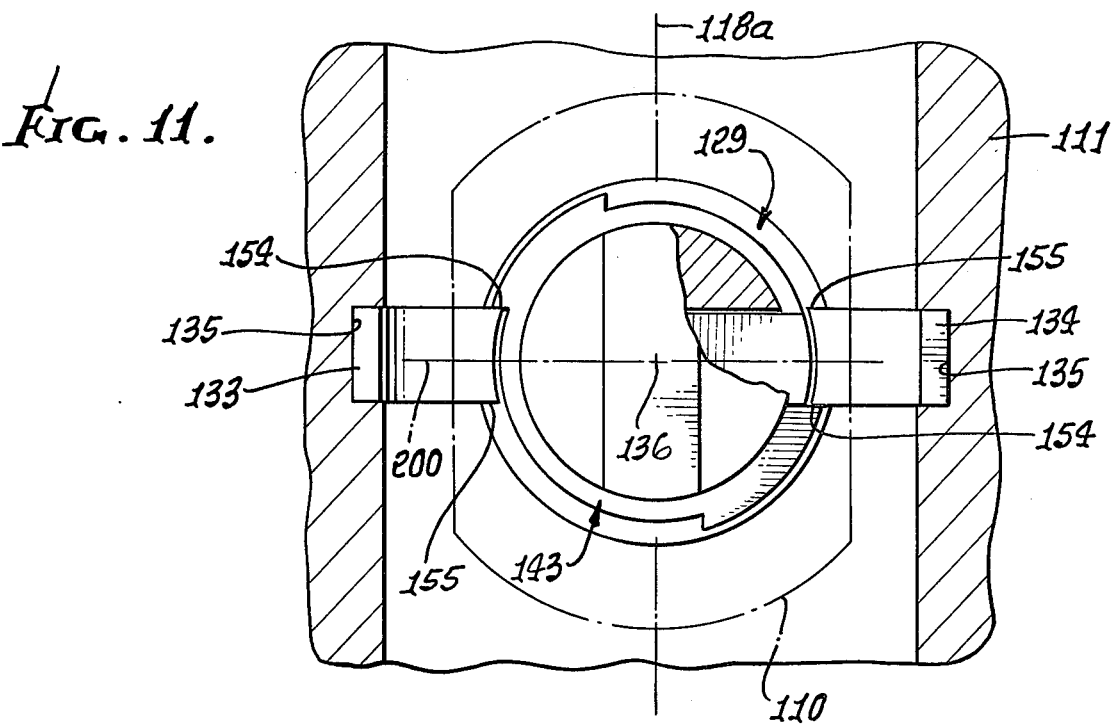
FIG. 11 is a view like FIG. 5, showing a modification.
Figure 13:
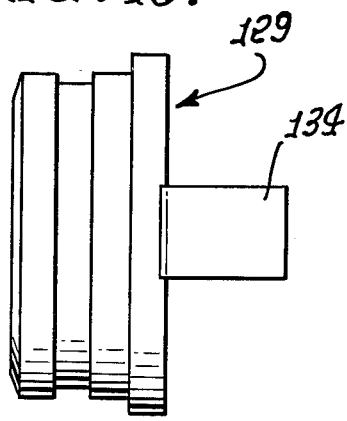
FIG. 13 is a side view of the FIG. 12 sleeve.
Figure 12:
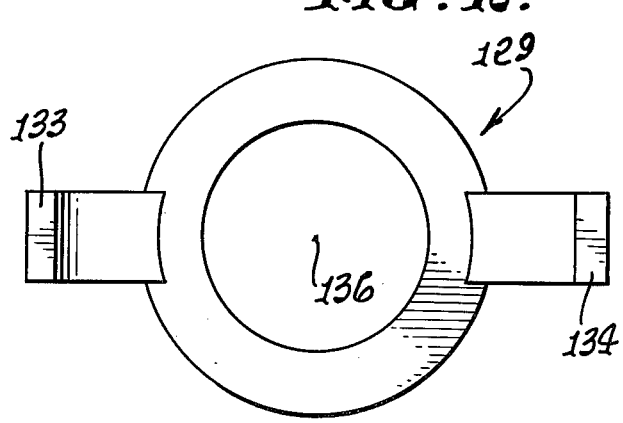
FIG. 12 is an end view of the sleeve used in FIG. 11.

Referring now to FIG. 11, which corresponds to FIG. 4, the tangs 133 and 134 of sleeve 129 (corresponding to sleeve 29) project in spaced apart relation for reception in internal grooving 135 in body 111. See also body bore 111a. The latter extends annularly about axis 118a. Note that the tangs and groove 135 are bisected by a plane 200 passing through the lateral axis 136, about which stopper 110 rotates, plane 200 being normal to axis 118a. (In FIG. 4, by way of contrast, the tangs 33 and 34 and groove 35 are offset relation to axis 36, in the direction of axis 18a).

Figure 14:
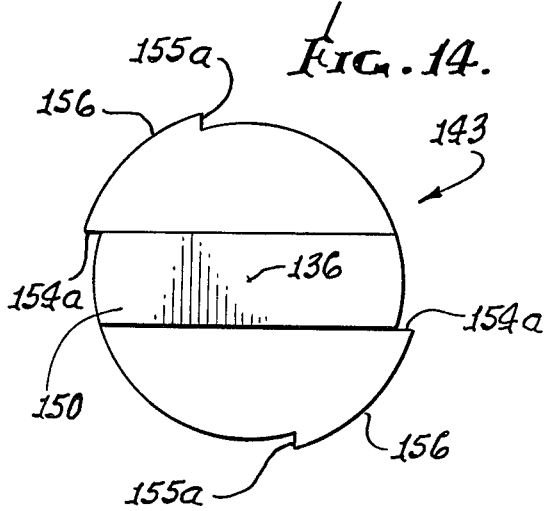
FIG. 14 is an end view of the crank shown in FIG. 11.
Figure 15:
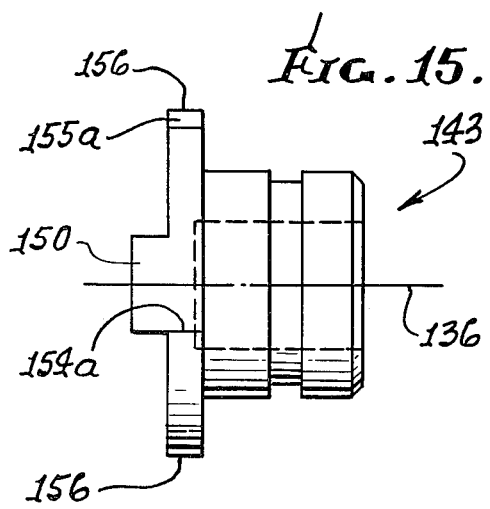
FIG. 15 is a side view of the FIG. 14 crank.

The crank 143 in FIGS. 14 and 15 has two arcuate quadrant edges 156 at diametrically opposite sides of axis 36. Stop shoulders 154a and 155a on each edge are spaced apart at less than 90°, about axis 136, in view of the symmetrical location of the tangs, to engage stop shoulders 154 and 155 on the sleeve.

I claim:

1. For use in rotating a valve stopper in a valve body forming flow passages at longitudinally opposite sides of the stopper to be brought into communication through the stopper when the stopper is rotated from closed to open positions, the body having a side opening, the combination comprising
    (a) a sleeve adapted for reception in said side opening, the sleeve having retainer structure to interfit shoulder structure on the body for blocking rotation of the sleeve in the side opening,
    (b) a crank received in the sleeve for rotation therein, thereby to rotate the valve stopper, and
    (c) interengageable stop shoulder structure on the crank and sleeve to limit rotation of the crank and the stopper at stopper open and closed positions,
    (e) said retainer structure including tang means projecting for reception in grooving in the body.

2. The combination of claim 1 wherein said shoulder structure on the sleeve is located on said retainer structure.

3. For use in rotating a valve stopper in a valve body forming flow passages at longitudinally opposite sides of the stopper to be brought into communication through the stopper when the stopper is rotated from closed to open positions, the body having a side opening, the combination comprising
    (a) a sleeve adapted for reception in said side opening, the sleeve having retainer structure to interfit shoulder structure on the body for blocking rotation of the sleeve in the side opening,
    (b) a crank received in the sleeve for rotation therein, thereby to rotate the valve stopper, and
    (c) interengageable stop shoulder structure on the crank and sleeve to limit rotation of the crank and the stopper at stopper open and closed positions,
    (d) said shoulder structure on the sleeve being located on said retainer structure,
    (e) the body defining a longitudinal axis and grooving extending about said axis, and said retainer structure including two tangs projecting in spaced apart relation for reception in said grooving.

4. The combination of claim 3 wherein the sleeve has a lateral axis, each tang including a first portion extending in the direction of said lateral axis and a second portion extending at an angle to said first portion for reception in said grooving, the stop shoulder structure on the retainer structure located on said first portions of the tangs.

5. The combination of claim 4 including said valve stopper and valve body, the sleeve received in said body side opening, the tang second portions received in said body grooving and extending in mutually flaring relation.

6. The combination of claim 5 wherein said stop shoulder structure on the first portions of the tangs includes shoulders spaced substantially 180° about said sleeve lateral axis.

7. The combination of claim 1 including a coupler having tongue and groove connection with the crank accommodating sliding of the coupler along the crank, the coupler adapted to couple the crank to the stopper.

8. The combination of one of claims 1-6 including a coupler having tongue and groove connection with the crank accommodating sliding of the coupler along the crank, the coupler adapted to couple the crank to the stopper, and wherein the coupler is blocked by the retainer structure against said relative sliding, in one of said stopper open and closed positions.

9. The combination of claim 1 including said valve stopper and a coupler having tongue and groove connections with the crank and also with the valve stopper to provide universal adjustment in a plane generally normal to a lateral axis of stopper rotation.

10. The combination of claim 9 wherein the coupler is located between opposed end faces of the stopper and crank, said retainer structure having tangs between which said coupler is located.

11. The combination of claim 1 including said body defining an internal groove receiving said retainer structure to extend adjacent the stopper surface.

12. For use in rotating a valve stopper in a valve body forming flow passages at longitudinally opposite sides of the stopper to be brought into communication through the stopper when the stopper is rotated from closed to open positions, the body having a side opening, the combination comprising
   (a) a sleeve adapted for reception in said side opening, the sleeve having retainer structure to interfit shoulder structure on the body for blocking rotation of the sleeve in the side opening,
   (b) a crank received in the sleeve for rotation therein, thereby to rotate the valve stopper, and
   (c) interengageable stop shoulder structure on the crank and sleeve to limit rotation of the crank and the stopper at stopper open and closed positions,
   (d) said body defining an internal groove receiving said retainer structure to extend adjacent the stopper surface,
   (e) the retainer structure including tangs having generally spherically extending surface extents adjacent the stopper.

13. For use in rotating a valve stopper in a valve body forming flow passages at longitudinally opposite sides of the stopper to be brought into communication through the stopper when the stopper is rotated from closed to open positions, the body having a side opening, the combination comprising
   (a) a sleeve adapted for reception in said side opening, the sleeve having retainer structure to interfit shoulder structure on the body for blocking rotation of the sleeve in the side opening,
   (b) a crank received in the sleeve for rotation therein, thereby to rotate the valve stopper, and
   (c) a coupler having transversely slidable interconnection with the crank and being adapted for adjustable connection with the stopper, to rotatably couple the crank to the stopper,
   (e) said retainer structure including tang means projecting for reception in grooving in the body.

14. The combination of claim 13 including stop shoulder structure on sleeve located on said retainer structure.

15. For use in rotating a valve stopper in a valve body forming flow passages at longitudinally opposite sides of the stopper to be brought into communication through the stopper when the stopper is rotated from closed to open positions, the body having a side opening, the combination comprising
   (a) a sleeve adapted for reception in said side opening, the sleeve having retainer structure to interfit shoulder structure on the body for blocking rotation of the sleeve in the side opening,
   (b) a crank received in the sleeve for rotation therein, thereby to rotate the valve stopper, and
   (c) a coupler having transversely slidable interconnection with the crank and being adapted for adjustable connection with the stopper, to rotatable couple crank to the stopper,
   (d) stop shoulder structure on the sleeve located on said retainer structure, and
   (e) said retainer structure including two tangs projecting in spaced apart relation for reception in grooving in the body.

16. The combination of claim 15 including said valve stopper, the coupler having tongue and groove connections with the crank and also with the valve stopper to provide universal adjustment in a plane generally normal to a lateral axis of stopper rotation.

17. The combination of claim 16 wherein the coupler is located between opposed end faces of the stopper and crank, and transversely between said tangs.

18. The combination of claim 13 including said body defining an internal groove receiving said retainer structure to extend adjacent the stopper surface.

19. The combination of claim 18 wherein said tang means includes tangs having generally spherically extending surface extents adjacent the stopper.

20. The combination of claim 4 wherein the tangs are offset relative to a plane that contains said lateral axis and is normal to a longitudinal axis defined by said flow passages.

21. The combination of claim 4 wherein the tangs are bisected by a plane that contains said lateral axis and is normal to a longitudinal axis defined by said flow passages.

* * * * *